(No Model.) 4 Sheets—Sheet 1.
D. F. MESSER & E. F. WOODBURY.
MACHINE FOR FORMING BATS FOR FELT BOOTS, &c.
No. 344,589. Patented June 29, 1886.
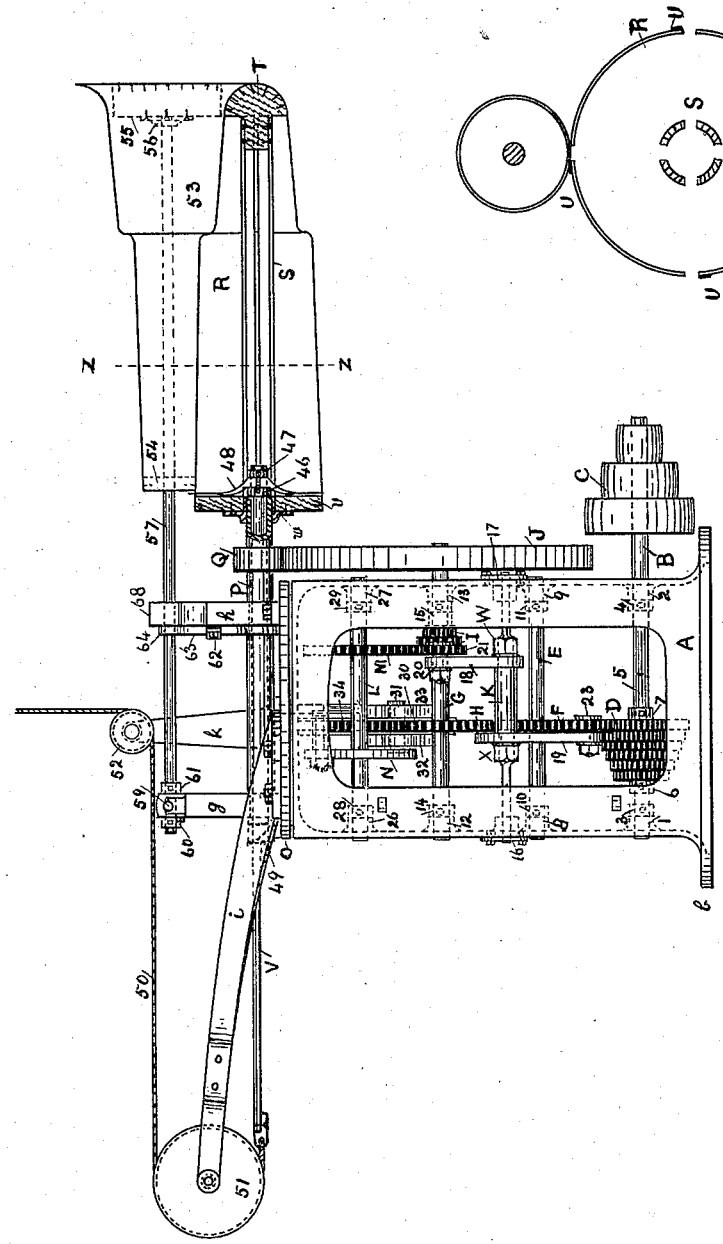
WITNESSES:
J. Naschold.
Walter L. Perry
INVENTORS.
Daniel F. Messer
E. Frank Woodbury

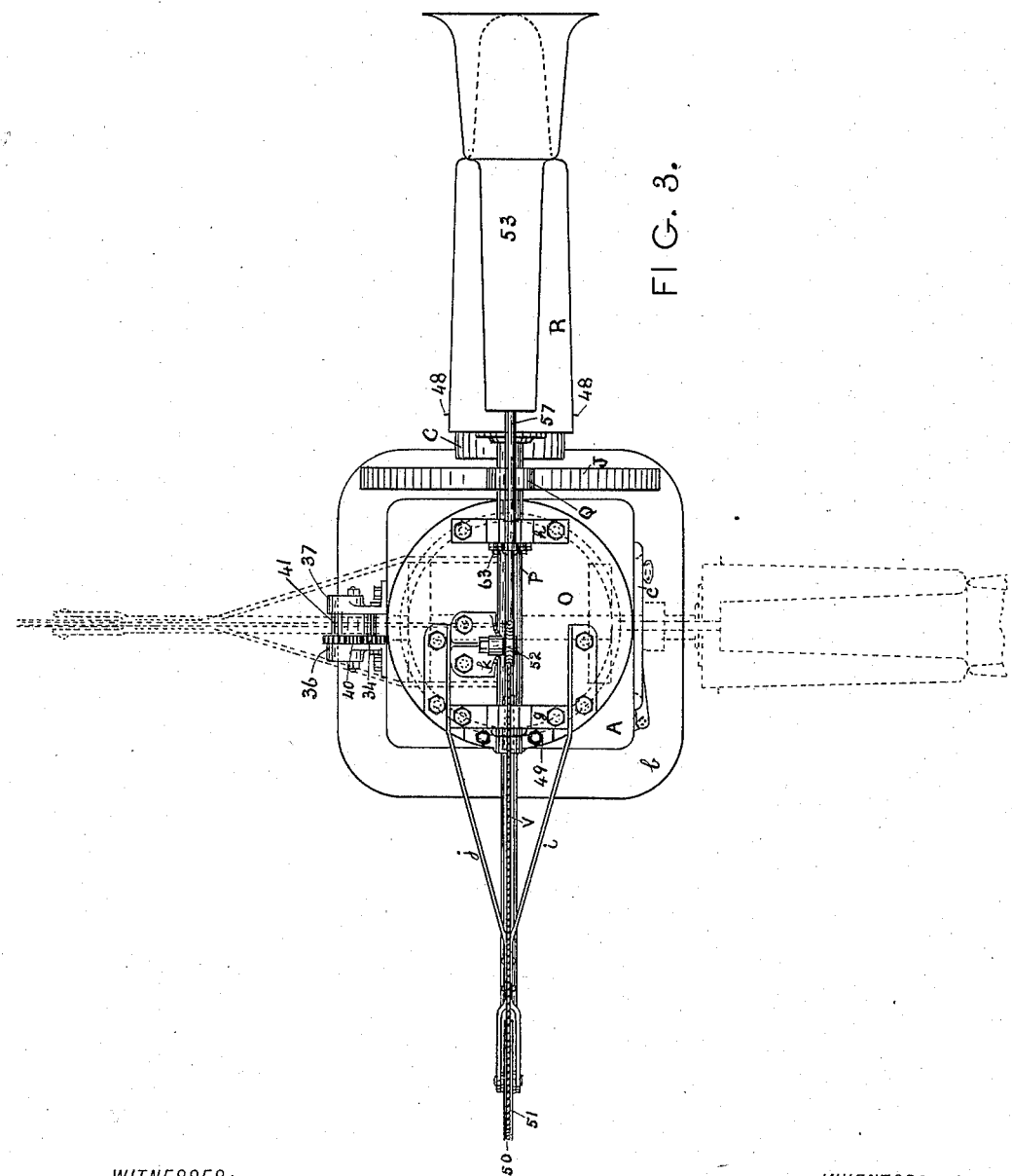

(No Model.) 4 Sheets—Sheet 3.
D. F. MESSER & E. F. WOODBURY.
MACHINE FOR FORMING BATS FOR FELT BOOTS, &c.
No. 344,589. Patented June 29, 1886.
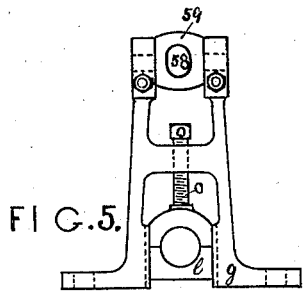
FIG. 5.
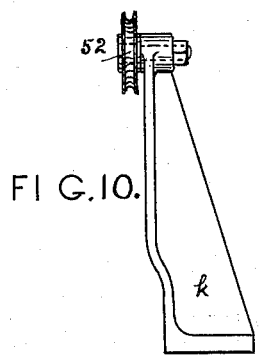
FIG. 10.
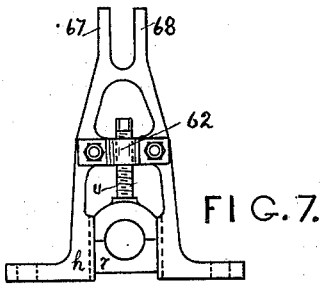
FIG. 7.
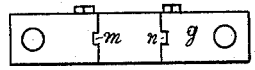
FIG. 6.
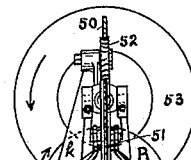
FIG. 8.
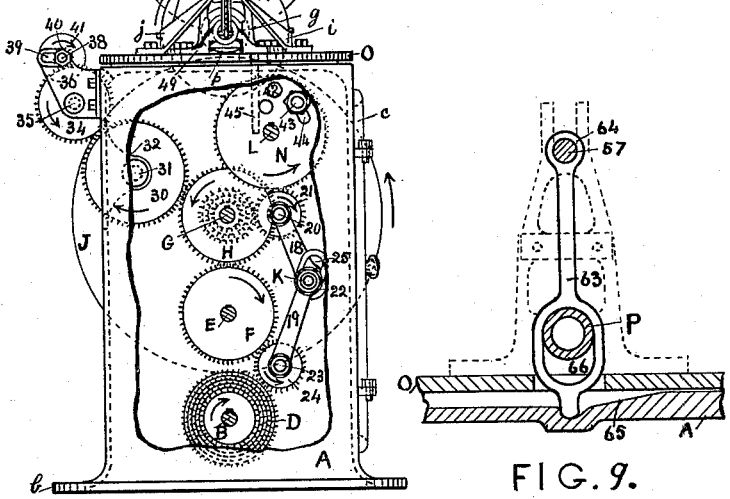
FIG. 4.
FIG. 9.
WITNESSES:
J. Naschold
Walter L. Perry
INVENTORS.
Daniel F. Messer
E. Frank Woodbury (No Model.) 4 Sheets—Sheet 4.

D. F. MESSER & E. F. WOODBURY.

MACHINE FOR FORMING BATS FOR FELT BOOTS, &c.

No. 344,589. Patented June 29, 1886.

WITNESSES:
J. Narchold.
Walter L. Perry

INVENTORS.
Daniel F. Messer,
E. Frank Woodbury

UNITED STATES PATENT OFFICE.

DANIEL F. MESSER, OF KENNEBUNK, MAINE, AND E. FRANK WOODBURY, OF BOSTON, MASS.; SAID WOODBURY ASSIGNOR TO SAID MESSER.

MACHINE FOR FORMING BATS FOR FELT BOOTS, &c.

SPECIFICATION forming part of Letters Patent No. 344,589, dated June 29, 1886.

Application filed April 30, 1886. Serial No. 200,751. (No model.)

*To all whom it may concern:*

Be it known that we, DANIEL F. MESSER, of Kennebunk, in the county of York and State of Maine, and E. FRANK WOODBURY, of Boston, in the county of Suffolk and State of Massachusetts, have jointly invented certain new and useful Improvements in Machines for Forming Bats for Felt Boots, &c., of which the following, taken in connection with the accompanying drawings, is a specification.

Our invention relates to machines designed for making felt boots, shoes, and stockings from sliver or felting material as it comes from a wool-carding machine or other source of supply.

The object of our invention is to produce an automatic felt-boot machine, one that will do its work automatically, and consequently better and cheaper than other machines designed for similar uses.

It also has for its object the production of an effective, durable, reliable, and a comparatively cheap machine that will be superior to any other machine designed for similar uses now in the market.

Figure 11:
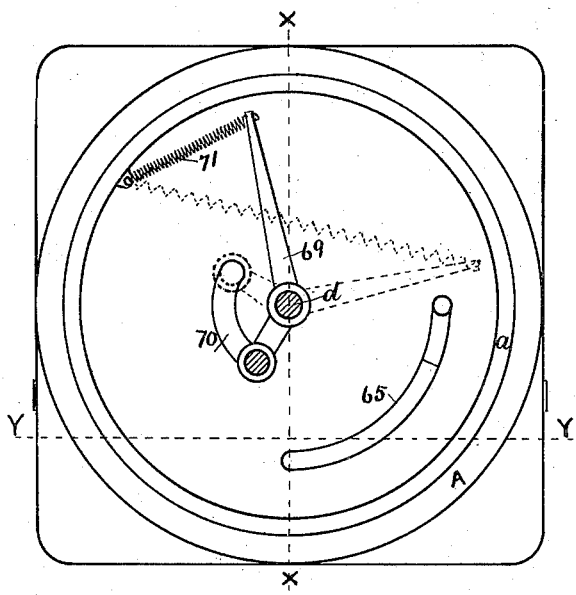
Figure 13:
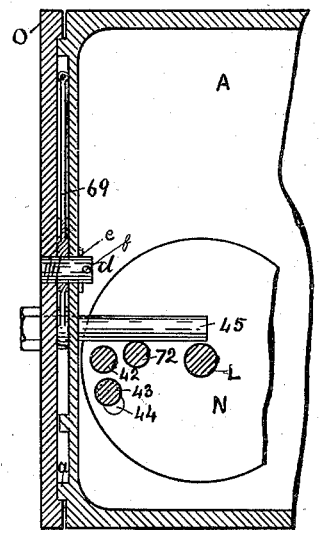
Figure 12:
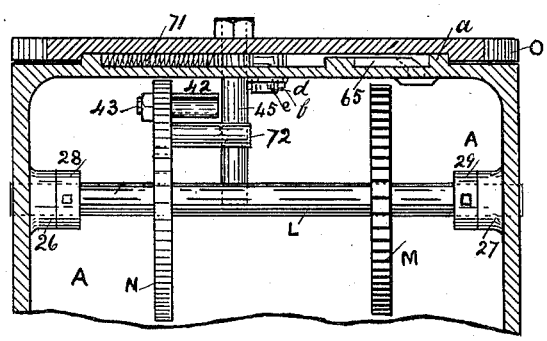

Figure 1 represents in front elevation and partial section our felt-boot machine, with the door of the frame removed to show interior arrangement of parts, and Fig. 2 is a section of same on line Z Z. Fig. 3 is a full plan of Fig. 1. Fig. 4 is a side elevation of Fig. 1, with part of the frame broken and removed to show interior arrangement of parts. Figs. 5 and 6 represent, respectively in side elevation and inverted plan, enlarged views of the trunnion-standard, and Figs. 7 and 8 represent in side elevation and inverted plan, respectively, enlarged views of the yoke-standard. Fig. 9 represents enlarged views of details relating to the construction and arrangement of the yoke and inclined way. Fig. 10 represents in side elevation the guide-wheel support. Figs. 11, 12, and 13 represent, respectively in plan and sections of same on lines Y Y and X X, respectively, enlarged views of details of devices relating to mechanism used in giving a quarter-turn to the table and its superimposed parts.

All the parts herein described are to be made of suitable material.

The frame A is provided at its upper end with the ledge *a*, at its lower end with the base flange *b* and door *c*. The driving-shaft B, provided with the cone-pulley C and change-gears D, is mounted in the bearings 1 and 2 of the frame, and is held laterally in position by the collars 3 and 4, which are fastened to the shaft by means of set-screws. The change-gears D can be adjusted laterally on the driving-shaft B to the necessary extent by means of a keyway in the gears, spline 5, and collars 6 and 7, all in the usual manner. The shaft E, provided with the gear F, is mounted in the bearings 8 and 9 of the frame, and is held laterally in position by the collars 10 and 11, which are secured to the shaft by means of set-screws. The gear F is fastend to the shaft E. The shaft G, provided with the gear H, change-gears I, and friction driving-wheel J, is mounted in the bearings 12 and 13, and is held laterally in position by the collars 14 and 15, which are fastened to the shaft by means of set-screws. The change-gears I can be adjusted laterally on the shaft G to the necessary extent by means of keyway in the gears, spline, and collars, in the same manner as the change-gears D are adjusted on the driving-shaft B. The gear H and friction driving-wheel J are fastened to the shaft G. The intermediate gear-shaft, K, is fastened to the frame by means of the flange-pieces 16 and 17, which are bolted to the frame, and it is provided with the links 18 and 19. The link 18 has fastened at one end the pin 20, on which the intermediate gear 21 is free to revolve. The other end of the link is provided with the slot 22, which is so constructed and arranged in its connection with the shaft K and nut W that it is adjustable to the extent necessary to allow the intermediate gear, 21, to act as an intermediate between any of the change-gears I and the gear M. The link 19 has fastened at one end the pin 23, on which the intermediate gear 24 is free to revolve. The other end of the link is provided with the slot 25, which is so constructed and arranged in its connection with the shaft K and nut X that it is adjustable to the extent necessary to allow the intermediate gear 24 to act as an intermediate between any of the change-gears D and the gear F. The shaft L, provided with the gear M and wheel N, both of which are fastened to the shaft, is mounted in the bearings 26 and 27 of the frame, and is held laterally in position by the collars 28 and 29, which are fastened to the shaft by means of set-screws. Gear 30 is free to revolve on the pin 31, which is secured to the frame-lugs 32 and 33. Gear 34 is free to revolve on the pin 35, which is secured to the supports 36 and 37, which are bolted to the frame. To the same supports is secured the pin 38, which is adjustable within the slot 39. Mounted and free to revolve upon the pin 38 are arranged the gear 40 and friction-wheel 41, which are fastened together. By reason of adjustable pin 38 change-gears can be connected with and thereby give change speeds to friction-wheel 41.

The relative construction and arrangement and operation of the gears are as follows: The driving-shaft being revolved by means of power applied to cone-pulley C, any of the change-gears D can be placed in mesh with the intermediate gear 24, which meshes with gear F and drives shaft E. By means of the change-gears D the relative speeds of the driving-shaft B and shaft E can be changed. Gear F meshes with gear H and drives shaft G. The gears H, 30, 34, and 40 mesh one with the other, as shown, and the friction-wheel 41 being fastened to gear 40 they revolve together. The shaft G being revolved by means of the gear F, any of the change-gears I can be placed in mesh with the intermediate gear 21, which meshes with gear M and drives shaft L. By means of the change-gears I the relative speeds of the shafts L and G can be changed. To the wheel N are fastened the pins 72, 42, and 43. Pin 43 is adjustable within the slot 44, and all the pins are adapted to engage pin 45, as will be hereinafter explained. The table O rests upon and fits over the ledge a of the frame A, and is provided with the pin d, which is journaled in the frame A, and is provided with the washer e and pin f. The table O is also provided with pin 45, which is adapted to engage pins 72, 42, and 43. The table is also provided with the trunnion-standard g and yoke-standard h, sheave-supports i and j, and guide-wheel support k. The trunnion-standard g is provided with the box l, which is held adjustably by means of the guides m and n, set-screw o, and leaf-spring p or shims. The yoke-standard h is provided with the box r, which is held adjustably by means of the guides s and t, set-screw u, and a leaf-spring or shims, (not shown,) which is a duplicate of leaf-spring p. In the boxes l and r is journaled the hollow shaft P, the diameter of which is reduced where it bears in the boxes, so that it will be held laterally in position by reason of the sides thus formed. The hollow shaft P has secured to it the friction-wheel Q, which is made to rotate by means, in operation, of its frictional contact with the friction driving-wheel J. It also has secured to it the cone-former R, which is preferably made of sheet metal in the following manner. The hollow shaft P has fastened to it the circular head v, by means of the flange w. It also has fastened to it the slotted tube S, to which is fastened the end piece, T. The cone-former R is tacked onto the circular head v and end piece, T. The cone-former R is also provided with the longitudinal strips U U U U of jute, cotton, or other suitable material, about as long as the cone-former.

Within the hollow shaft P is located the push-shaft V, constructed and arranged as follows: To one end is attached by means of collars 46 and 47 the spider 48, which has four fingers adapted to work through the four slots in the slotted tube S and cone-former R. The method of attaching is such that the spider is free to rotate upon the push-shaft V and may be operated back and forth within the slots by means of push-shaft V. The push-shaft V has that portion of its length that projects beyond the hollow shaft P reduced in section to the extent of about one half of its diameter, so as to present a flat surface for contact with the friction-wheel 41. The push-shaft-guide support 49, bolted to the table O, is made so that the reduced section of the push-shaft V, which plays through it, always presents its flatted surface to the action of the friction-wheel 41. To the other end of the push-shaft V is attached a suitable weight. The pull-back rope 50, which passes over sheave 51, properly mounted in the sheave-supports i and j, thence over guide-wheel 52, properly mounted on guide-wheel supports k, thence over suitable guide wheel or wheels, (not shown,) and, as previously stated, is connected with a weight, (not shown,) which is sufficient to keep the spider 48 against the circular head v when the push-shaft V is released from contact with the friction-wheel 41, as will be hereinafter explained.

The compressor 53, preferably made of sheet metal, is tacked on and held to the heads 54 and 55 by means of tacks, flange 56, and flange-screws. The heads 54 and 55 are fastened to the compressor-shaft 57. The compressor-shaft 57 is free to rotate in the slotted trunnion-bearing 58 of the trunnion 59. Any endwise motion of the compressor-shaft is prevented by means of the collars 60 and 61. At the same time it can rise vertically within the slotted trunnion-bearing 58, and it can also rise vertically beyond what the length of slot in slotted trunnion-bearing 58 will allow, on account of the trunnion being free to rotate in its bearings and the compressor-shaft being free to rise in the jaws 67 and 68 of the yoke-standard h. The yoke-standard h is provided with the yoke-bearing 62, in which the yoke 63 is free to move in vertical lines. The eye 64 of the yoke surrounds the compressor-shaft 57, which is free to rotate within it, and the slotted end of the yoke is in contact with the inclined way 65 of the table A by means of the slotted yoke portion 66 of the yoke which embraces the hollow shaft P. When the compressor-shaft 57 is arranged to move vertically within the jaws 67 and 68 of the yoke standard h, it can rise to the extent of the difference of the diameter of the hollow shaft P and the greatest length of the slotted portion of the yoke.

The lever 69, fulcrumed on the pin d, has one end secured to pin 45, which is fastened to the table O, and is free to move in the circular slot 70 in the frame A, and to the other end is fastened the spiral spring 71, all designed to operate as hereinafter specified.

The felt-boot machine is so placed in its relation with a wool-carding machine (not shown) that the sliver as it is delivered from the wool-carding machine comes directly in contact with the cone-former R, which is revolved in the direction necessary for it to pick up the sliver by means of one or more of the strips U coming in contact with the sliver and holding it to the cone-former.

The cone-former is caused to revolve by means of the train of mechanism previously described, which is operated by belt power applied to the cone-pulley C from some suitable source of supply. The belt is preferably taken in some suitable way from the main driving-shaft of the wool-carding machine, so that any irregularity of motion effects alike both machines. As the sliver is deposited upon the cone-former R, the compressor 53, which is revolved by means of its compressing contact with the sliver on the cone-former, is made to rise to the extent of the thickness of sliver deposited and compressed. This it is arranged to do horizontally, or nearly so, by means of the slotted trunnion-bearing 58 of the trunnion 59, and the jaws 67 and 68 of the yoke-standard h. After sufficient sliver has been deposited upon the cone-former R, an amount that is determined by the weight of sliver and the number of revolutions of the cone-former, all of which is gaged by the relative speeds of the cone-pulley C, and change-gears D, and is represented by about three-quarters of a revolution of the wheel N, the pin 72 and then pin 42 engage the pin 45, which is fastened to the table O, and works through the circular slot 70 in the frame A, and the pin 42 is so arranged that, in the moving one-quarter of a revolution of the wheel N, it pushes the table O and its superimposed parts around about one quarter of a revolution. Then by reason of the pin 43, which is adjustable, the table O can be kept in its one-quarter turn position for a sufficient length of time to allow the friction-wheel 41 to perform its duty, as will be hereinafter explained. The reason of having both pins, 72 and 42, is that the pin 72, being the nearer to the center of shaft L, has less velocity than pin 42, and therefore does its starting of the table O easier than it would be possible to do if only pin 42 were used.

The results of the one-quarter turn of the table O are as follows: The friction-wheel Q leaves the friction driving-wheel J. Consequently the cone-former R stops revolving at the same time the cone-former breaks the sliver. At the same time the yoke 63, by its upward action, due to its lower end being in contact with the inclined way 65 of the frame A, forces up the compressor-shaft 57, which rotates within the eye 64 and compressor 53 to such a height as will raise the compressor out of contact with the sliver and out of the way of the fingers of the spider 48 when operated. The table O is held, as previously stated, in its one-quarter turn long enough to allow friction-wheel 41, by its revolutions and frictional contact with the flattened portion of the push-rod V, to allow the push-rod to do its duty, which is to push the accumulated sliver or bat from the cone-former R into a suitable place of deposit by means of the fingers of the spider 48, which operates through the longitudinal slots in the cone-former R and slotted tube S, thereby pushing the bat from the cone-former. The relative movements of the parts are such that after the bat is pushed from the cone-former the pin 43 has passed out of contact with pin 45. Then the table O is drawn back to its original starting position by means of the spiral spring 71, which operates the lever 69, pin 45, and table, all as previously described.

While the table O is being drawn back the following takes place: As soon as push-rod V is disengaged from contact with the friction-wheel 41 the pull-back rope 50, which is attached to the push-rod V, and operates by means of a suitable weight (not shown) over sheaves 51 and 52, all as previously stated, to the effect that the push-rod V is quickly pulled back until the spider strikes the circular head v of the cone-former R, where it is out of the way of the compressor 53, which is permitted to resume its original position of contact with the cone-former R, for the reason that the yoke 63 returns to its original position in the inclined way 65.

When the cone-former resumes its original position—that is to say, so that it can pick up the sliver from the wool-carding machine—the friction-wheel Q is rotated by reason of its contact with friction-driving wheel J, the result being the repetition of the automatic movements described, which, as summarized, consist in, first, the picking up of the sliver by the cone-former R, strips U U U U, and compressor 53 from the wool-carding machine; second, the winding up of a gaged quantity of sliver upon the cone-former R; third, the one-quarter turn of the table O, resulting as follows: a, the breaking of the sliver; B, the lifting of the compressor 53; C, the engagement of friction-wheel 41 with push-rod V; D, the pushing of the bat from the cone-former R; fourth, the one-quarter turn back to its first position of the table O, resulting as follows: E, the disengagement of the push-rod V from the friction-wheel 41; F, the pulling back of the push-rod V and spider 48 by the weight (not shown) and pull-back rope 50; G, the lowering of the compressor 53 upon the cone-former R; H, the engagement of the friction-wheel Q with the friction-driving wheel J, which is the beginning of the automatic movements recited.

The construction and arragement of our invention shown and described can be varied without materially interfering with its successful operation. For instance, gears can be substituted for friction-wheels, and friction-wheels can be substituted for gears. The mechanism for giving one-quarter turn to the table O can be changed, so that the motion or one-quarter turn may be caused by cam or cam-wheel with its usual attendant mechanism.

When the cone-former R in operation returns and picks up the sliver, the wool-carding machine continuing during the time the cone-former did revolve, owing to the one-quarter turn of the table O, it is obvious that an accumulation of sliver has been delivered from the wool-carding machine, which is allowed to fall on or toward the floor in such a manner that when picked up by the cone-former a double thickness will be wound upon the cone-former until the accumulation of sliver is consumed, when only one thickness will be taken by the cone-former until it has taken its gaged quantity, the result of this arrangement being that the cone-former practically consumes the sliver as fast as it is produced and delivered by the wool-carding machine.

What we claim as new, and desire to secure by Letters Patent, is—

1. The slotted cone-former R, provided with strips U, circular head $v$, and end piece, T, in combination with slotted tube S, substantially as described.

2. In combination, cone-former R, provided with circular head $v$, end piece, T, slotted tube S, and hollow shaft P, substantially as specified.

3. In combination, cone-former R, slotted tube S, hollow shaft P, and push-rod V, adapted to operate therein and provided with spider 48, and having a flatted portion constructed and arranged to engage friction-wheel 41, substantially as described.

4. In combination, cone-former R, slotted tube S, hollow shaft P, provided with friction-wheel Q, push-rod V, adapted to operate therein and provided with spider 48, and flatted portion adapted to engage with friction-wheel 41, push-back rope 50, and operative mechanism, substantially as described.

5. In combination, hollow shaft P, provided with cone-former and friction-wheel Q, table O, trunnion-standard $g$, yoke-standard $h$, push-rod V, provided with spider 48, flatted portion, and collars 46 and 47, pull-back rope 50, and operative mechanism, substantially as and for the purposes specified.

6. In combination, hollow shaft P, provided with cone-former and friction-wheel Q, table O, trunnion-standard $g$, yoke-standard $h$, push-rod V, provided with spider 48, flatted portion, and collars 46 and 47, pull-back rope 50, sheave 51, supported by sheave supports $i$ and $j$, guide-wheel 52, supported by guide-wheel support $k$, and operative mechanism, substantially as described.

7. Compressor 53, in combination with compressor-shaft 57, having heads 54 and 55 and flange 56, and collars 60 and 61, substantially as described.

8. Table O, provided with trunnion-standard $g$ and yoke-standard $h$, in combination with compressor 53 and compressor-shaft 57, substantially as described.

9. Table O, provided with trunnion-standard $g$, having trunnion 59, provided with slot 58, yoke-standard $h$, provided with jaws 67 and 68, in combination with compressor-shaft 57, having collars 60 and 61, and compressor 53, substantially as described.

10. Table O, in combination with trunnion-standard $g$, having adjustable box $l$, trunnion 59, having slot 58, substantially as and for the purposes specified.

11. Trunnion-standard $g$, provided with guides $m$ and $n$, box $l$, leaf spring $p$, set-screw $o$, in combination with trunnion 59, mounted in bearings and provided with slot 58, substantially as set forth.

12. Table O, in combination with yoke-standard $h$, having adjustable box $r$, and provided with jaws 67 and 68, substantially as described.

13. Yoke-standard $h$, provided with guides $s$ and $t$, leaf-spring, set-screw $u$, and jaws 67 and 68, in combination with compressor-shaft, substantially as described.

14. Yoke-standard $h$, provided with yoke-bearing 62, in combination with yoke 63, substantially as described.

15. Yoke 63, provided with eye 64, slotted yoke portion 66, in combination with frame A, having inclined way 65, substantially as described.

16. Frame A, in combination with table O, adapted to work thereon, substantially as described.

17. Frame A, provided with ledge $a$ and circular slot 70, in combination with table O, provided with recess to fit over ledge $a$, and having pin $d$, provided with washer $e$, and pin $f$, substantially as described.

18. Frame A, provided with circular slot 70, in combination with table O, provided with pin 45, substantially as set forth.

19. Frame A, provided with circular slot 70, in combination with table O, provided with pin 45, and operative mechanism, substantially as described.

20. Frame A, provided with circular slot 70, in combination with table O, pin $d$, lever 69, spiral spring 71, and operative mechanism, substantially as set forth.

21. Frame A, in combination with table O and its superimposed parts, substantially as described.

22. In combination with the table O and push-rod V, the guide-support 49, the construction being such that the push-rod V is held against rotary action without interference with its freedom to move in a longitudinal direction, substantially as described.

23. In combination with the table O and pin 45, the wheel N and its operative mechanism, substantially as described.

24. In combination with the table O and pin 45, the wheel N, provided with pins 72 42 and adjustable pin 43, substantially as described.

25. In combination with frame A and table O, adapted to work thereon, the wheel N, provided with devices to operate table O, substantially as described.

26. In combination with frame A and table O, the wheel N, provided with devices to operate the table, and lever 69, adapted to operate the return motion of the table, substantially as set forth.

27. Frame A, in combination with driving-shaft B, provided with cone-pulley C and change-gears D, substantially as set forth.

28. Frame A, provided with flange-pieces 16 and 17, in combination with intermediate gear-shaft, K, provided with adjustable links 18 and 19 and intermediate gears, 21 and 24, substantially as described.

29. Frame A, in combination with shaft E, having gear F, substantially as described.

30. Frame A, in combination with shaft G, having gear H, change-gears I, and friction driving-wheel J, substantially as described.

31. Frame A, in combination with shaft L, having gear M, and wheel N, substantially as specified.

32. Frame A, provided with frame-lugs 32 and 33, in combination with pin 31 and gear 30, substantially as described.

33. Frame A, provided with supports 36 and 37, having slots 39, in combination with pin 35, gear 34, pin 38, gear 40, and friction-wheel 41, substantially as described.

34. In a felt-boot machine, the combination of the following elements composing the cone-driving mechanism, all substantially as described, consisting of the driving-shaft B, provided with cone-pulley C and change-gears D, link 19, adjustable on shaft K, provided with pin 23 and intermediate gear, 24, shaft E, provided with gear F, shaft G, provided with gear H, change-gears I, and friction driving-wheel J, arranged to drive cone-former R, by reason of its engagement with friction-wheel Q.

35. In a felt-boot machine, the combination of the following elements composing the table one-quarter-turn mechanism, all substantially as described, consisting of shaft G, having change-gears I, link 18, adjustable on shaft K and provided with pin 20, and intermediate gear, 21, shaft L, provided with gear M, and wheel N, having pins adapted to engage pin 45 of table O.

36. In a felt-boot machine, the combination of the following elements composing the push-rod mechanism, all substantially as described, consisting of shaft G, having gear H, gear 30, mounted on pin 31, gear 34, mounted on pin 35, mounted within slot 39 on pin, gear 40, and friction-wheel 41 adapted to engage flatted portion of push-rod V.

37. In a felt-boot machine, the combination of the following elements, all substantially as described: mechanism for picking up, winding, and compressing a gaged quantity of sliver, mechanism for giving about one-quarter turn to the table, mechanism for breaking the sliver, lifting compressor, and pushing bat from cone-former, mechanism for giving table about one-quarter reverse turn, mechanism for pulling back push-rod and spider, lowering compressor, and the re-engagement of friction-wheel with friction driving-wheel.

In testimony whereof we have signed our names to this specification, in the presence of two subscribing witnesses, on this 21st day of April, A. D. 1886.

DANIEL F. MESSER.
E. FRANK WOODBURY.

Witnesses:
JACOB NASCHOLD,
WALTER L. PERRY.